(12) United States Patent
Oki

(10) Patent No.: US 8,194,049 B2
(45) Date of Patent: Jun. 5, 2012

(54) CAPACITIVE MOTION DETECTION DEVICE AND INPUT DEVICE USING THE SAME

(75) Inventor: Toshiyuki Oki, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 353 days.

(21) Appl. No.: 12/511,984

(22) Filed: Jul. 29, 2009

(65) Prior Publication Data

US 2009/0284496 A1    Nov. 19, 2009

Related U.S. Application Data

(63) Continuation of application No. PCT/JP2008/051322, filed on Jan. 29, 2008.

(30) Foreign Application Priority Data

Jan. 31, 2007    (JP) .................................. 2007-21333

(51) Int. Cl.
*G06F 3/044* (2006.01)
*G09G 5/00* (2006.01)

(52) U.S. Cl. ..... 345/174; 345/156; 345/173; 178/18.01; 178/18.06

(58) Field of Classification Search .......... 345/174–178; 178/18.01–18.05; 463/37–38
See application file for complete search history.

(56) References Cited

U.S. PATENT DOCUMENTS

| | | | |
|---|---|---|---|
| 4,305,007 A | 12/1981 | Hughes | |
| 5,886,687 A * | 3/1999 | Gibson | 345/173 |
| 6,411,285 B1 * | 6/2002 | Miyazawa | 345/173 |
| 6,621,487 B2 * | 9/2003 | Iwasaki et al. | 345/173 |
| 2004/0158374 A1 | 8/2004 | Suzuki | |
| 2004/0178997 A1 * | 9/2004 | Gillespie et al. | 345/173 |
| 2006/0022959 A1 | 2/2006 | Geaghan | |
| 2006/0028453 A1 | 2/2006 | Kawabe | |
| 2006/0033701 A1 | 2/2006 | Wilson | |
| 2006/0132447 A1 | 6/2006 | Conrad | |
| 2006/0250376 A1 * | 11/2006 | Takahashi | 345/173 |

(Continued)

FOREIGN PATENT DOCUMENTS

JP    06-149463    5/1994
(Continued)

OTHER PUBLICATIONS

Search Report dated May 13, 2008 from International Application No. PCT/JP2008/051322.

(Continued)

*Primary Examiner* — Lun-Yi Lao
*Assistant Examiner* — Md Saiful A Siddiqui
(74) *Attorney, Agent, or Firm* — Beyer Law Group LLP

(57) ABSTRACT

When a motion in the X-axis direction is detected, first electrodes are set as drive electrodes, and second electrodes are set as detection electrodes. A switching circuit performs switching so as to electrically connect a drive circuit to the first electrodes, electrically connect a first detection circuit to one of the second electrodes, and electrically connect a second detection circuit to the other second electrode. In a motion detection circuit in which connections are established in this manner, the drive circuit drives the drive electrodes, and then the position of an object to be detected in the X-axis direction is obtained from the difference between capacitances detected by the first and second detection circuits at this time.

21 Claims, 9 Drawing Sheets

U.S. PATENT DOCUMENTS

| | | | |
|---|---|---|---|
| 2007/0279385 A1* | 12/2007 | Woolley et al. | 345/168 |
| 2008/0012835 A1* | 1/2008 | Rimon et al. | 345/173 |
| 2009/0084612 A1 | 4/2009 | Mattice et al. | |
| 2009/0225055 A1 | 9/2009 | Oki | |
| 2009/0284465 A1 | 11/2009 | Oki et al. | |

FOREIGN PATENT DOCUMENTS

| | | |
|---|---|---|
| JP | 09-311761 | 12/1997 |
| JP | 2001-87549 | 4/2001 |
| JP | 2001-100905 | 4/2001 |
| JP | 2001-184160 | 7/2001 |
| JP | 2004-245606 | 9/2004 |
| JP | 2006-318082 | 11/2006 |

OTHER PUBLICATIONS

Search Report dated Jan. 8, 2008 from International Application No. PCT/JP2007/071928.

Office Action dated Sep. 7, 2011 from U.S. Appl. No. 12/466,352.

Office Action dated Oct. 12, 2011 from U.S. Appl. No. 12/511,981.

Search Report dated Mar. 4, 2008 from International Application No. PCT/JP2008/051321.

* cited by examiner

MOTIONS OF HAND

MOTIONS OF HAND

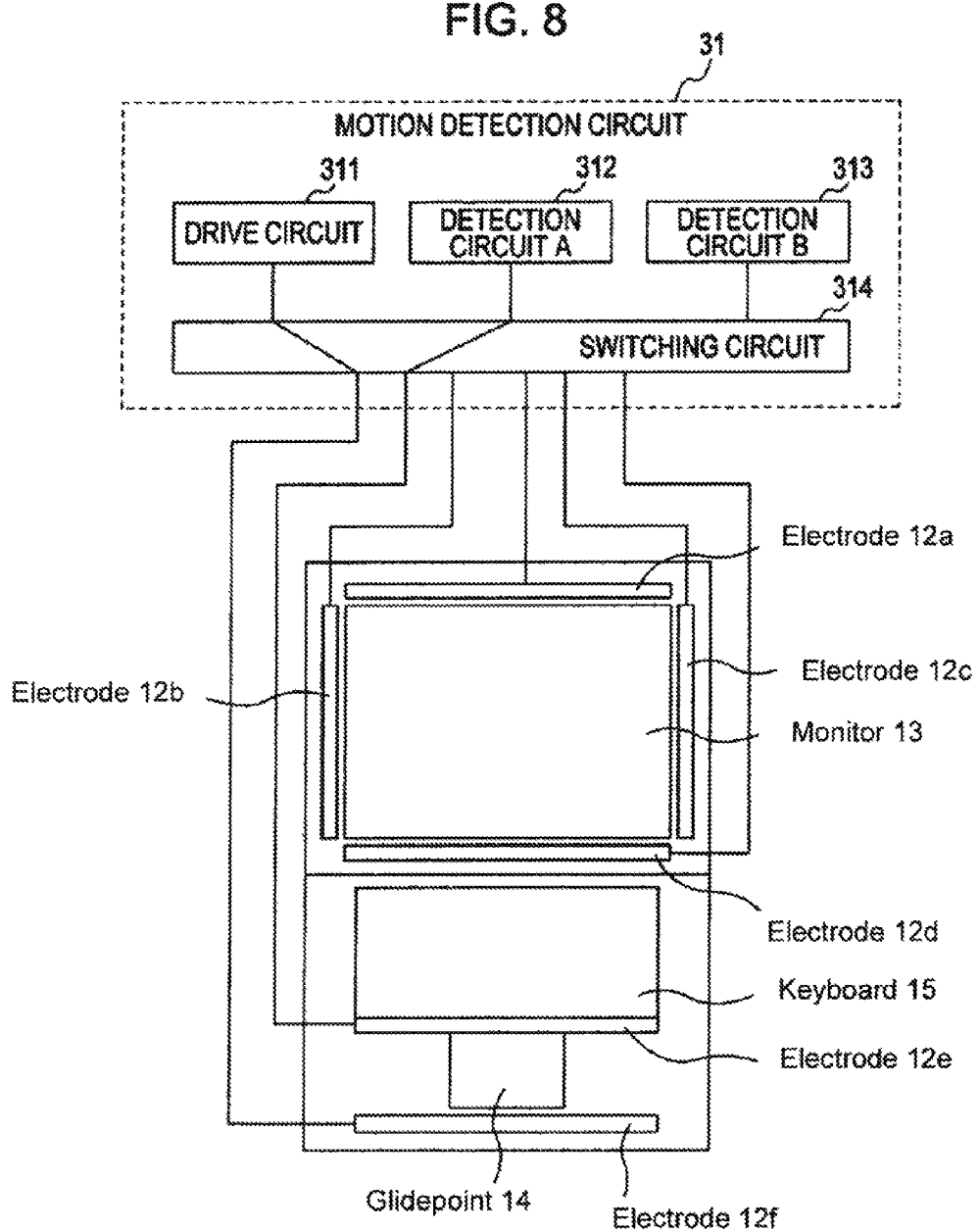

CAPACITIVE MOTION DETECTION DEVICE AND INPUT DEVICE USING THE SAME

CLAIM OF PRIORITY

This application is a Continuation of International Application No. PCT/JP2008/051322 filed on Jan. 29, 2008, which claims benefit of the Japanese Patent Application No. 2007-021333 filed on Jan. 31 2007, which are hereby incorporated by reference.

BACKGROUND OF THE INVENTION

1. Field of the Invention

The present invention relates to a capacitive motion detection device detecting, by the use of capacitances, the motions of an object to be detected in an area to be operated and an input device using the same.

2. Description of the Related Art

Methods for detecting the motions of an object to be detected, such as a human body, include, for example, a method for detecting the motions of a person by capturing the images of the person and outputting the motions to a control unit in a personal computer (PC), using at least one camera and an image processing unit (for example, Japanese Unexamined Patent Application Publication No. 2001-87549). Moreover, the methods include a method for outputting the motions to a control unit in a PC by embedding, for example, an acceleration sensor in a device and moving the device in specific directions.

However, in the method, in which a camera and image processing are used, the costs of hardware, software, and the like are high, and the space in which the method is used is limited because a specific space for capturing camera images needs to be prepared in advance. Moreover, in the method, in which an acceleration sensor is used, the hardware needs to be directly moved. When the hardware main body is moved, the device may be affected by vibrations. Moreover, even when, for example, a small input device in which an acceleration sensor is embedded is used, the small input device needs to be held in hand and operated.

SUMMARY OF THE INVENTION

In view of the aforementioned problems, the present invention provides a capacitive motion detection device and an input device using the same. The capacitive motion detection device has a simple configuration, has few limitations regarding the operating environment, does not affect a device due to vibrations, and need not include a specific input device.

A capacitive motion detection device according to a first aspect of the present invention includes a device main body, two or more detection electrode/drive electrode pairs in each of which a capacitance is formed between a detection electrode and a drive electrode, the detection electrode/drive electrode pairs being provided at detection positions of the device main body, detecting means for detecting a motion of an object to be detected from a variation in a capacitance obtained in each of the detection electrode/drive electrode pairs, and switching means for changing connections to the detection electrode/drive electrode pairs.

In this arrangement, since the motions of an object to be detected in an area to be operated are detected on the basis of a variation in a capacitance obtained in each of the two or more detection electrode/drive electrode pairs, a capacitive motion detection device that has a simple configuration, has few limitations regarding the operating environment, is not likely to affect a device due to vibrations, and need not include a specific input device can be implemented.

In the capacitive motion detection device according to the first aspect of the present invention, the device main body preferably includes a first area and a second area that is different from the first area, at least one electrode of the detection electrode/drive electrode pairs being provided in the first area, at least one electrode of the detection electrode/drive electrode pairs being provided in the second area, and the detecting means preferably detects motions in three axis directions.

In the capacitive motion detection device according to the first aspect of the present invention, the first area is preferably rectangular, a direction of a surface of the first area is preferably an area to be operated for the object to be detected, detection electrode/drive electrode pairs constituted by electrodes provided on two opposing sides of the first area are preferably detection electrode/drive electrode pairs that detect motions in a first axis direction and a second axis direction, and detection electrode/drive electrode pairs constituted by electrodes provided on two opposing sides of the first area and an electrode provided in the second area are preferably detection electrode/drive electrode pairs that detect a motion in a third axis direction.

In the capacitive motion detection device according to the first aspect of the present invention, a display unit is preferably provided in the first area or the second area.

In the capacitive motion detection device according to the first aspect of the present invention, input means is preferably provided in one area of the first area and the second area, the display unit being not provided in the one area.

In the capacitive motion detection device according to the first aspect of the present invention, the device main body preferably includes angle measuring means for measuring an angle between the first area and the second area, and when a motion in the third axis direction is detected, correction is preferably made using the angle measured by the angle measuring means.

An input device according to a second aspect of the present invention includes a device main body that includes the aforementioned capacitive motion detection device, and control means for operating the device main body on the basis of detection of a motion of the object to be detected, the detection being performed by the capacitive motion detection device, the control means being included in the device main body.

BRIEF DESCRIPTION OF THE DRAWINGS

FIG. 8 shows a configuration of electrode connections in mode detection according to the embodiment of the present invention.

DESCRIPTION OF THE PREFERRED EMBODIMENTS

An embodiment of the present invention will now be described in detail with reference to the attached drawings.

Figure 1:
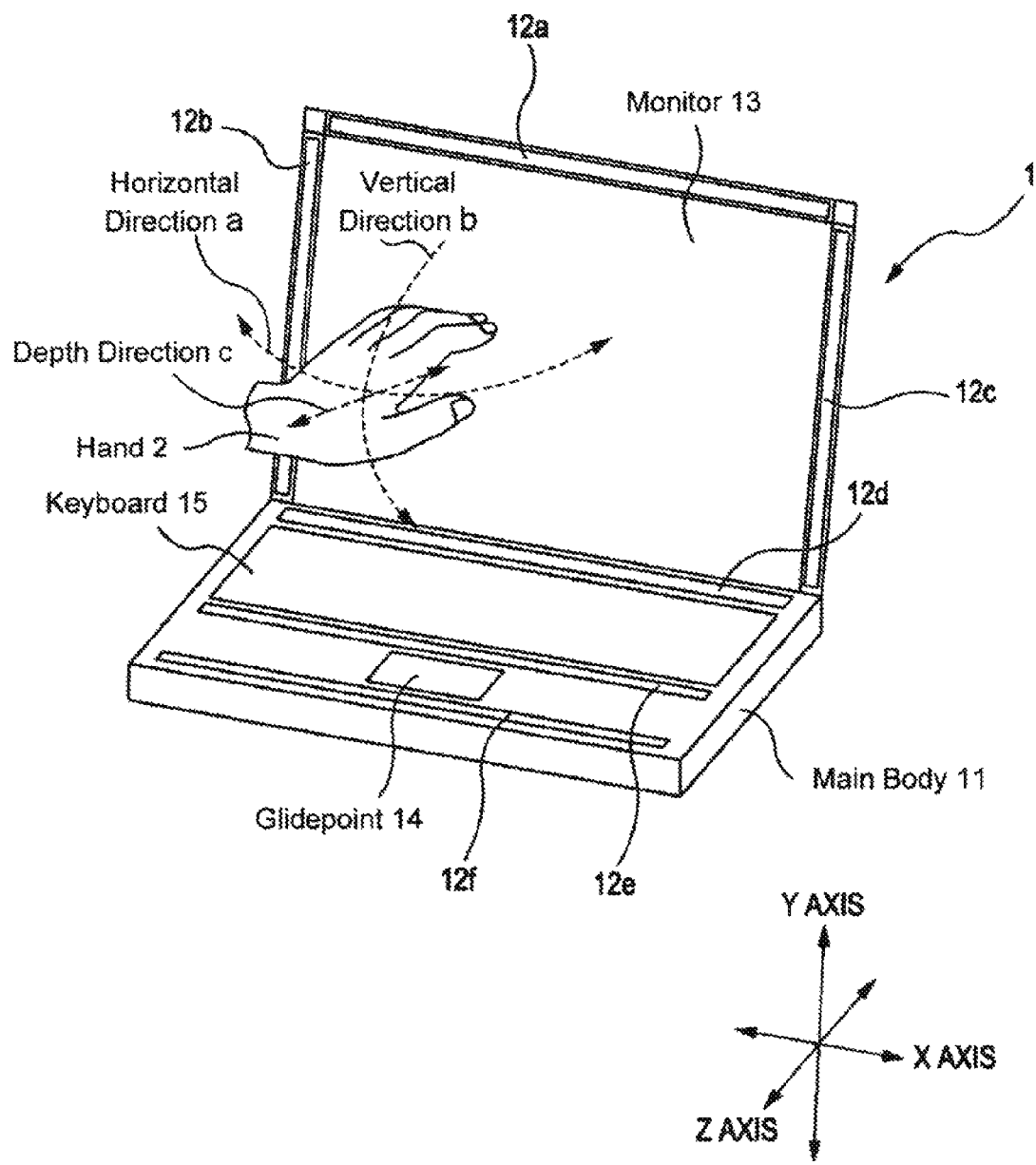
FIG. 1 shows an input device using a capacitive motion detection device according to an embodiment of the present invention.

FIG. 1 shows a notebook personal computer (PC) according to the present invention serving as an input device. The notebook PC 1 includes a monitor 13 and a keyboard 15 that are different areas. At least one electrode of a detection electrode/drive electrode pair is provided in each of the areas. That is, the notebook PC 1 includes electrodes 12a, 12b, 12c, and 12d formed around the monitor 13, an electrode 12e formed opposite the electrode 12d with the keyboard 15 between the electrode 12e and the electrode 12d, and an electrode 12f formed opposite the electrode 12e with a glidepoint 14 between the electrode 12f and the electrode 12e. These electrodes are provided at individual detection positions for an area to be operated and constitute two or more detection electrode/drive electrode pairs in each of which a capacitance is formed between a detection electrode and a drive electrode. Thus, motions in three axis directions can be detected. In this case, an area that extends in directions along a surface of the monitor 13 is set as an area to be operated serving as the detection reference for a hand 2 that is an object to be detected, the horizontal direction (a dashed arrow line a) of the monitor area is set as the X-axis, the vertical direction (a dashed arrow line b) of the monitor area is set as the Y-axis, and the depth direction (a dashed arrow line c) of the monitor area is set as the Z-axis.

Figure 2A:
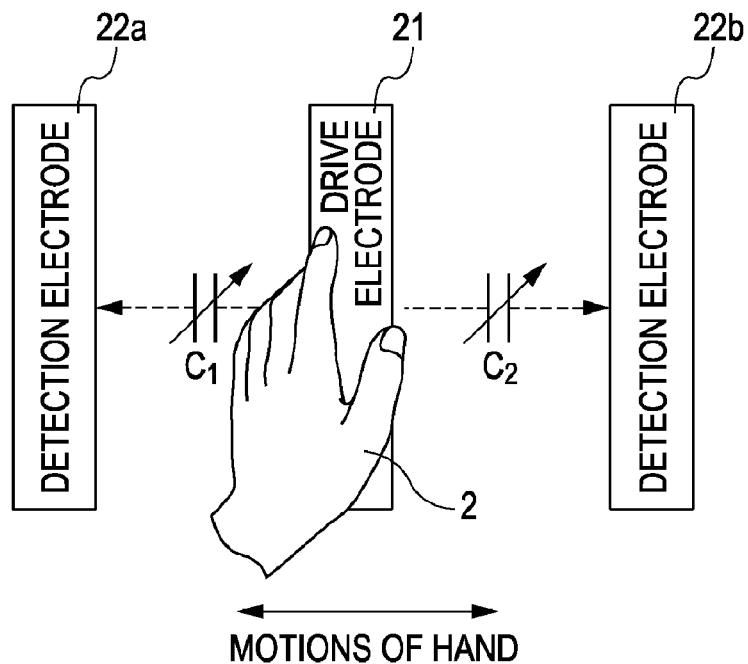
FIGS. 2A and 2B show the principle of capacitive motion detection according to the embodiment of the present invention.

When the position of an object to be detected, for example, a human body, is detected using capacitances, an arrangement in which a drive electrode 21 is disposed at the center, and detection electrodes 22a and 22b are disposed on the both sides of the drive electrode 21, as shown in FIG. 2A, is adopted. In this case, three electrodes, the drive electrode 21 and the detection electrodes 22a and 22b, constitute two detection electrode/drive electrode pairs. In this arrangement, a capacitance C1 is formed between the drive electrode 21 and the detection electrode 22a, and a capacitance C2 is formed between the drive electrode 21 and the detection electrode 22b. The position of the hand 2 can be detected by obtaining the difference between the capacitances C1 and C2.

Figure 2B:
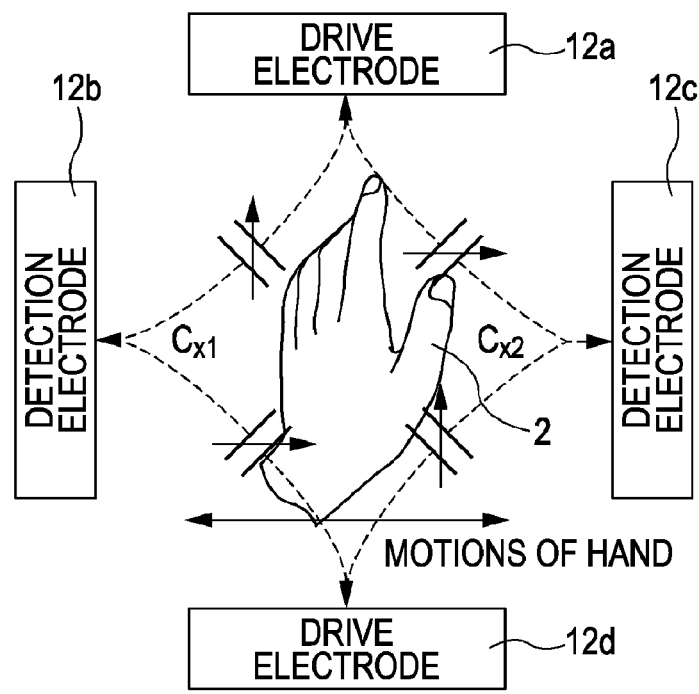

When it is difficult to dispose an electrode at the center of the monitor 13, as is the case with the notebook PC 1, the position of the hand 2 can be detected by adopting an arrangement of electrodes shown in FIG. 2B. That is, the position of the hand 2 can be detected by setting the electrodes 12a and 12d disposed on the upper and lower sides of the monitor 13 as drive electrodes and setting the electrodes 12b and 12c disposed on the right and left sides of the monitor 13 as detection electrodes. FIG. 2B shows a case where the position of the hand 2 moving in the X-axis direction is detected.

While, in the embodiment, the drive electrodes 12a and 12d are separately disposed on the upper and lower sides, and the detection electrodes 12b and 12c are disposed on the right and left sides, for example, the number of electrodes and the arrangement of electrodes are not limited as long as detection electrodes and drive electrodes are disposed at positions where an object to be detected in the area to be operated can be detected (as long as detection electrode/drive electrode pairs exist).

Figure 3:
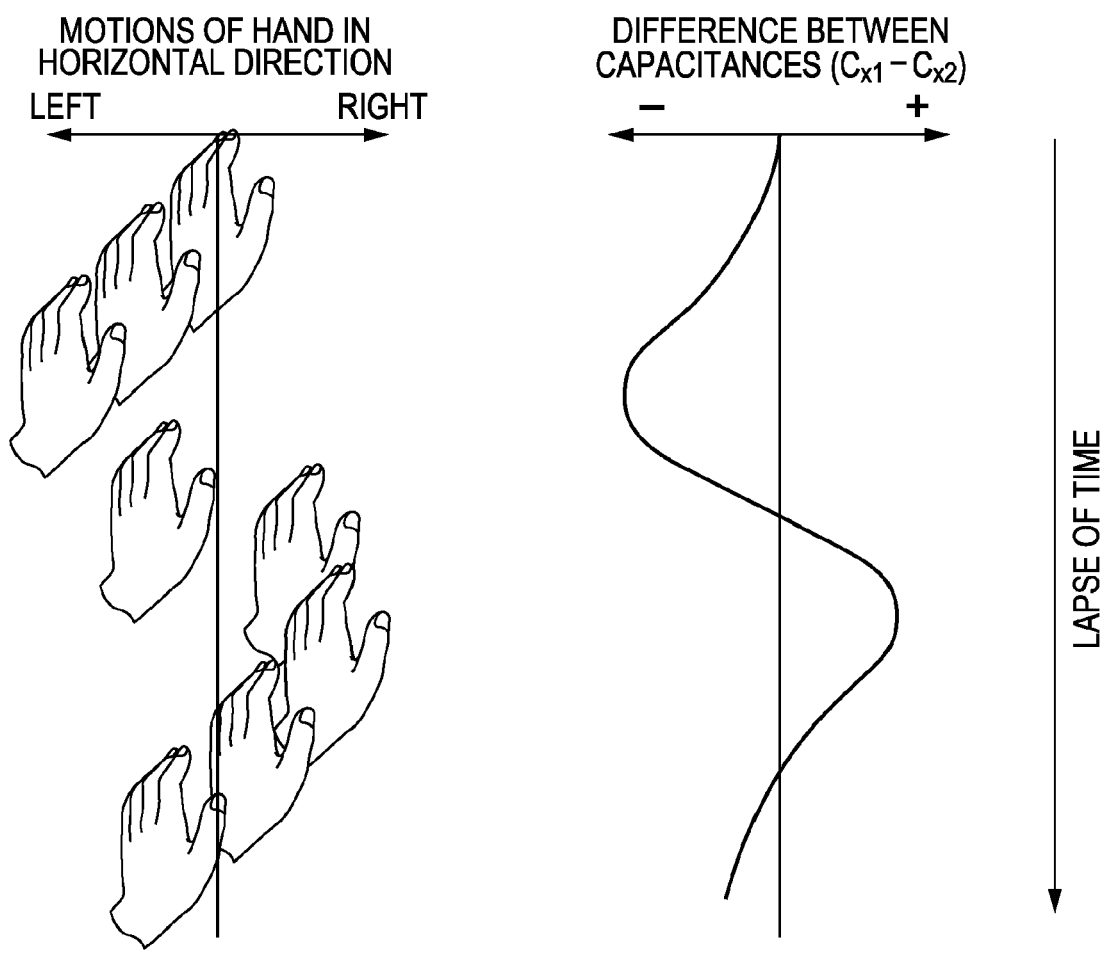
FIG. 3 shows the principle of the capacitive motion detection according to the embodiment of the present invention.

The motions of the hand 2 in the area to be operated can be detected from a variation in a capacitance obtained in each of the detection electrode/drive electrode pairs. Capacitances are always formed between the detection electrodes 12b and 12c and the drive electrodes 12a and 12d. In this case, a capacitance Cx1 is formed between the detection electrode 12b and the drive electrodes 12a and 12d, and a capacitance Cx2 is formed between the detection electrode 12c and the drive electrodes 12a and 12d. In such an arrangement, when the hand 2 moves in the right or left direction of the X-axis direction (the horizontal direction), the capacitances Cx1 and Cx2 change due to capacitances formed with the hand 2. For example, when the hand 2 moves in the right direction, the capacitance Cx1 increases, and the capacitance Cx2 decreases. Thus, the motions of the hand 2 in the X-axis direction (the horizontal direction) can be detected by obtaining the difference between the capacitances Cx1 and Cx2 (Cx1−Cx2), as shown in FIG. 3.

Moreover, the motions of the hand 2 in the Y-axis direction (the vertical direction) can be detected by setting the electrodes 12a and 12d disposed on the upper and lower sides of the monitor 13 as detection electrodes, setting the electrodes 12b and 12c disposed on the right and left sides of the monitor 13 as drive electrodes, and using a detection method that is similar to that described above. Moreover, the motions of the hand 2 in the Z-axis direction (the depth direction) can be detected by setting one of the electrodes 12a, 12b, 12c, and 12d around the monitor 13 and the electrodes 12e and 12f near the keyboard 15 and the glidepoint 14 as detection electrodes and setting an electrode near the center among the determined detection electrodes as a drive electrode, for example, setting the electrodes 12a and 12f as detection electrodes and setting the electrode 12d as a drive electrode. In this manner, the motions of the hand 2 in the three axis directions can be detected.

The notebook PC 1 serving as an input device includes a device main body 11 and a control unit that is included in the device main body 11 and operates the device main body 11 on the basis of motion detection. The device main body 11 includes detection electrode/drive electrode pairs described above, a motion detection circuit that detects the motions of an object to be detected in the area to be operated from a variation in a capacitance obtained in each of the detection electrode/drive electrode pairs, and a switching circuit that changes connections to the detection electrode/drive electrode pairs.

Figure 4:
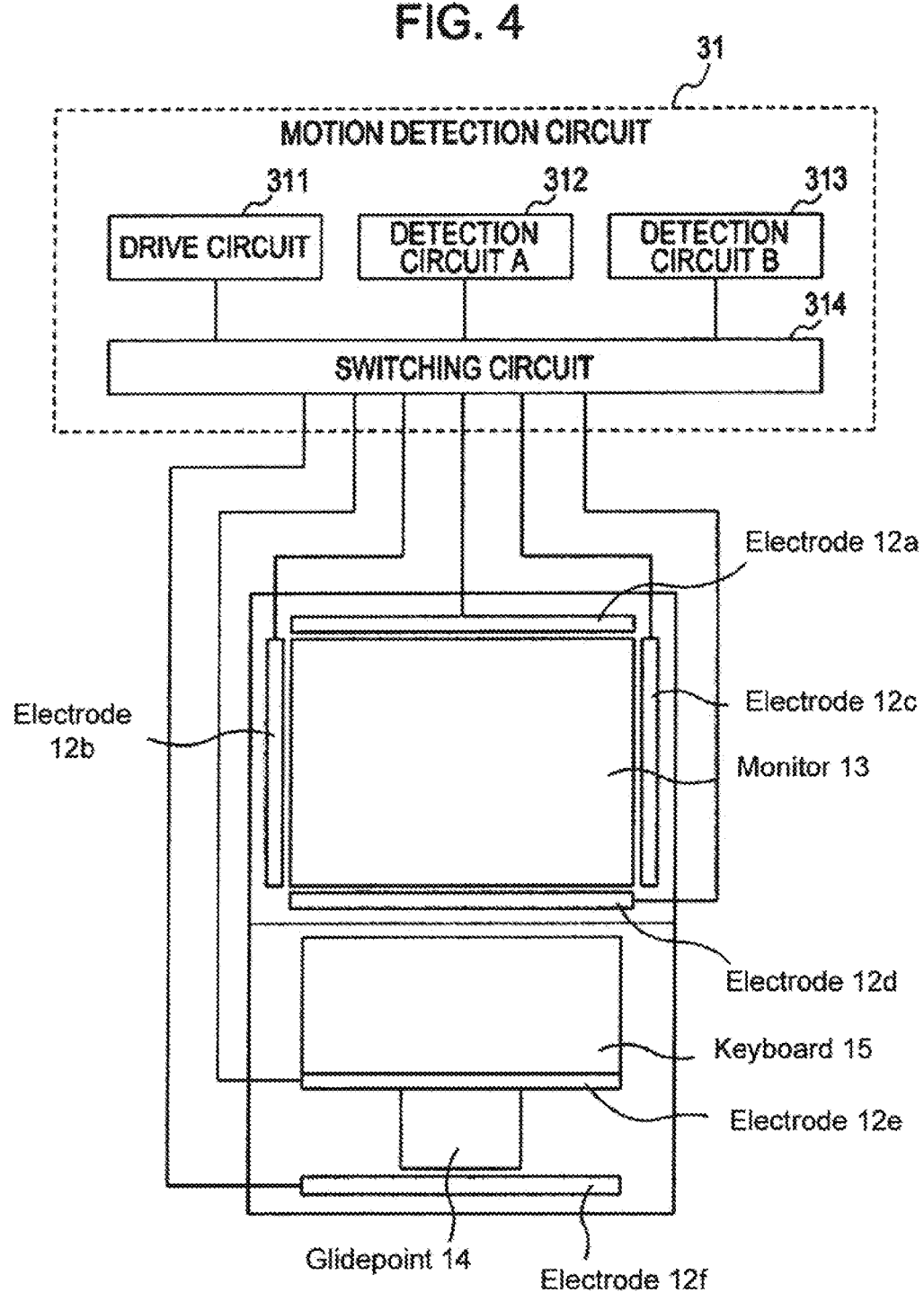
FIG. 4 shows a configuration of electrode connections in the capacitive motion detection according to the embodiment of the present invention.

The motion detection circuit 31 includes a drive circuit 311 that drives drive electrodes, detection circuits (A and B) 312 and 313 that detect capacitances from detection electrodes, and a switching circuit 314 that changes the arrangement of the drive circuit 311 and the detection circuits 312 and 313, i.e., changes connections to detection electrode/drive electrode pairs, as shown in FIG. 4.

Figure 5:
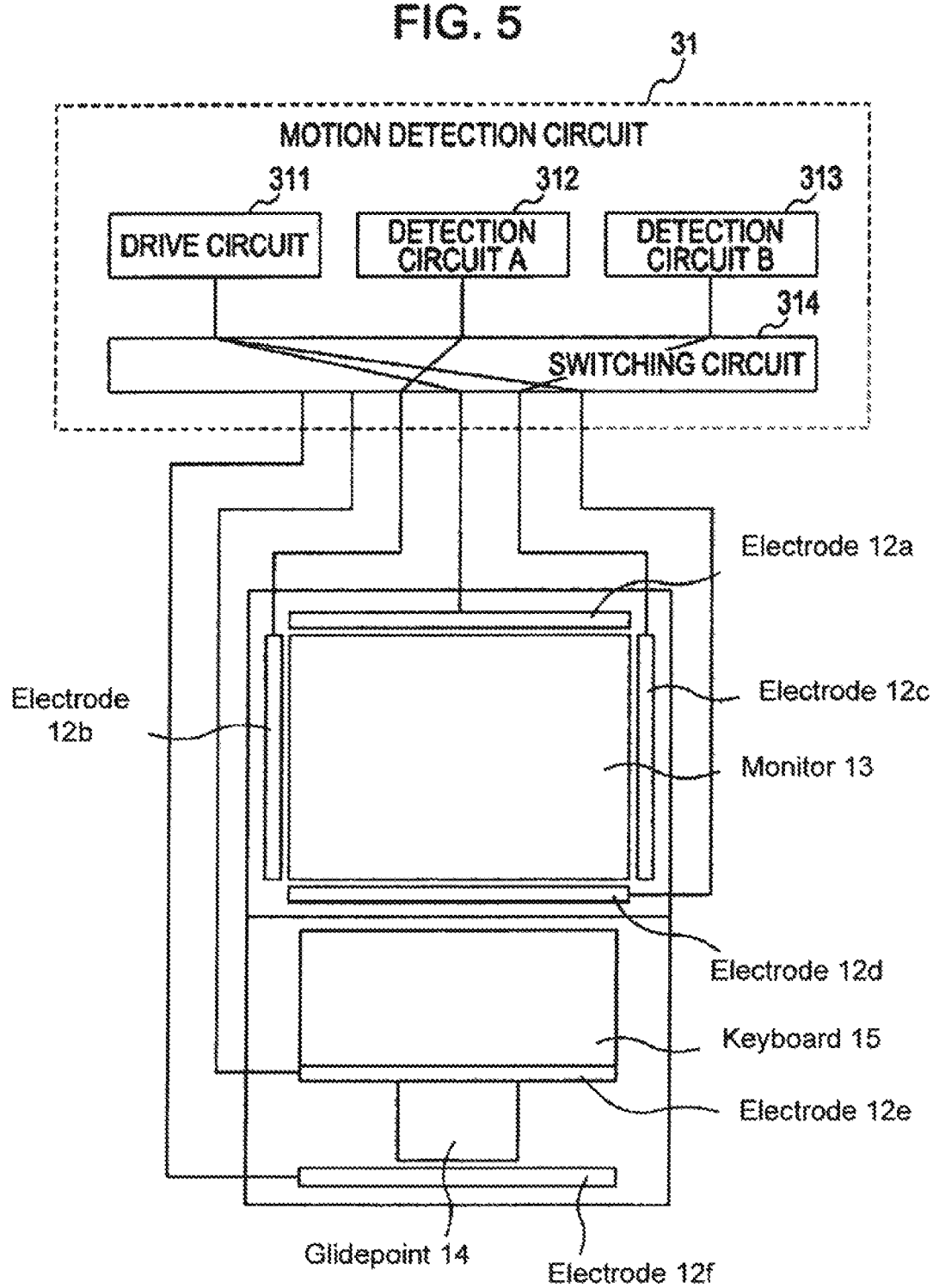
FIG. 5 shows a configuration of electrode connections in the capacitive motion detection according to the embodiment of the present invention.

Cases where motions in the X-axis, Y-axis, and Z-axis directions are detected using the detection electrode/drive electrode pairs in the arrangement shown in FIG. 4 will next be described. When motions in the X-axis direction are detected, the electrodes 12a and 12d are set as drive electrodes, and the electrodes 12b and 12c are set as detection electrodes, as shown in FIG. 5. Thus, the switching circuit 314 performs switching so as to electrically connect the drive circuit 311 to the electrodes 12a and 12d, electrically connect the detection circuit (A) 312 to the electrode 12b, and electrically connect the detection circuit (B) 313 to the electrode 12c. In the motion detection circuit 31, in which connections are established in this manner, motions can be detected using the arrangement shown in FIG. 2B. The drive circuit 311 drives the drive electrodes 12a and 12d, and then the position of an object to be detected in the X-axis direction is obtained from the difference between capacitances detected by the detection circuits (A and B) 312 and 313 at this time.

Figure 6:
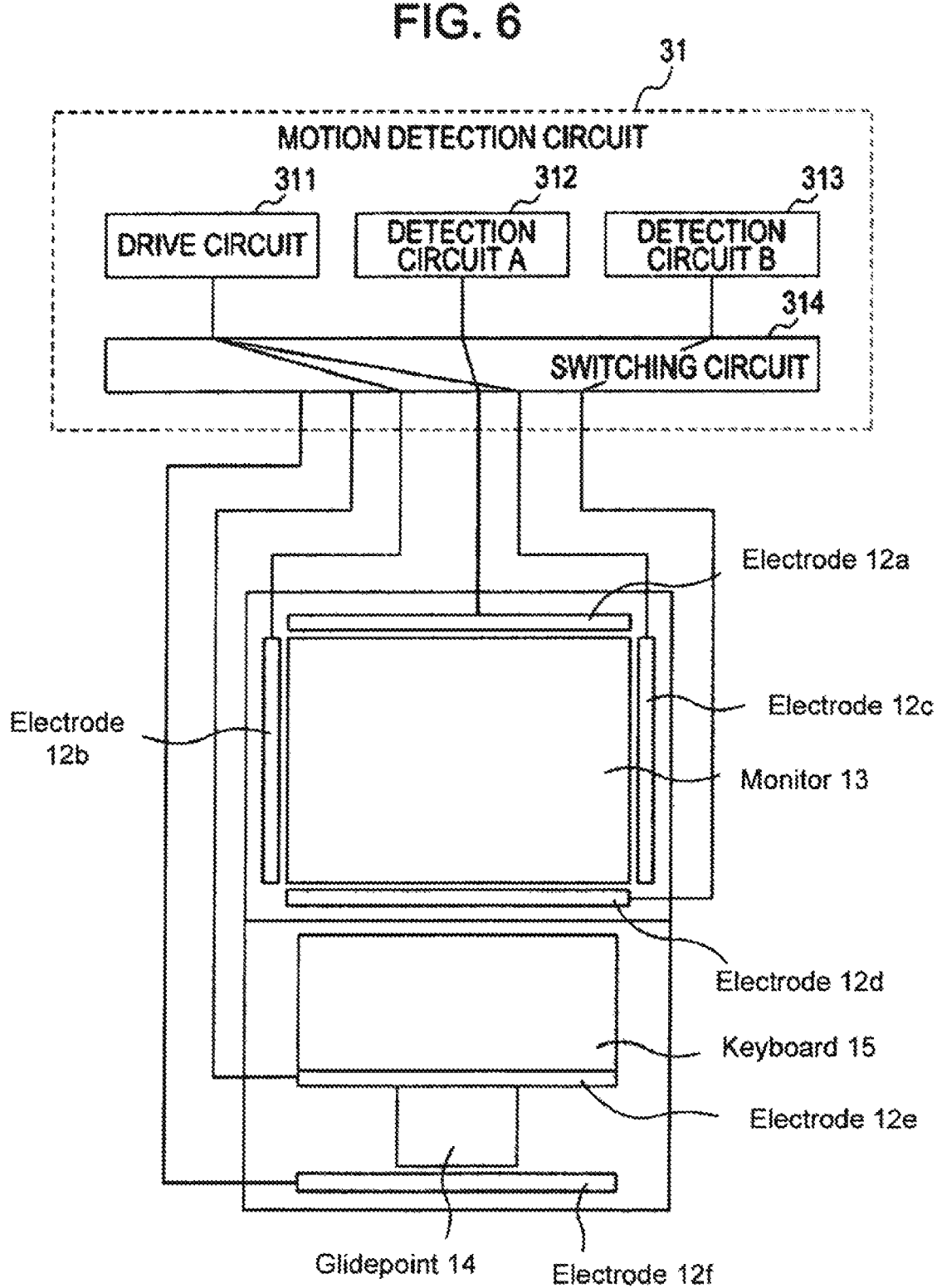
FIG. 6 shows a configuration of electrode connections in the capacitive motion detection according to the embodiment of the present invention.

When motions in the Y-axis direction are detected, the electrodes 12b and 12c are set as drive electrodes, and the electrodes 12a and 12d are set as detection electrodes, as shown in FIG. 6. Thus, the switching circuit 314 performs switching so as to electrically connect the drive circuit 311 to the electrodes 12b and 12c, electrically connect the detection circuit (A) 312 to the electrode 12a, and electrically connect the detection circuit (B) 313 to the electrode 12d. In the motion detection circuit 31, in which connections are established in this manner, motions can be detected using the arrangement shown in FIG. 2B. The drive circuit 311 drives the drive electrodes 12b and 12c, and then the position of an object to be detected in the Y-axis direction is obtained from the difference between capacitances detected by the detection circuits (A and B) 312 and 313 at this time.

Figure 7:
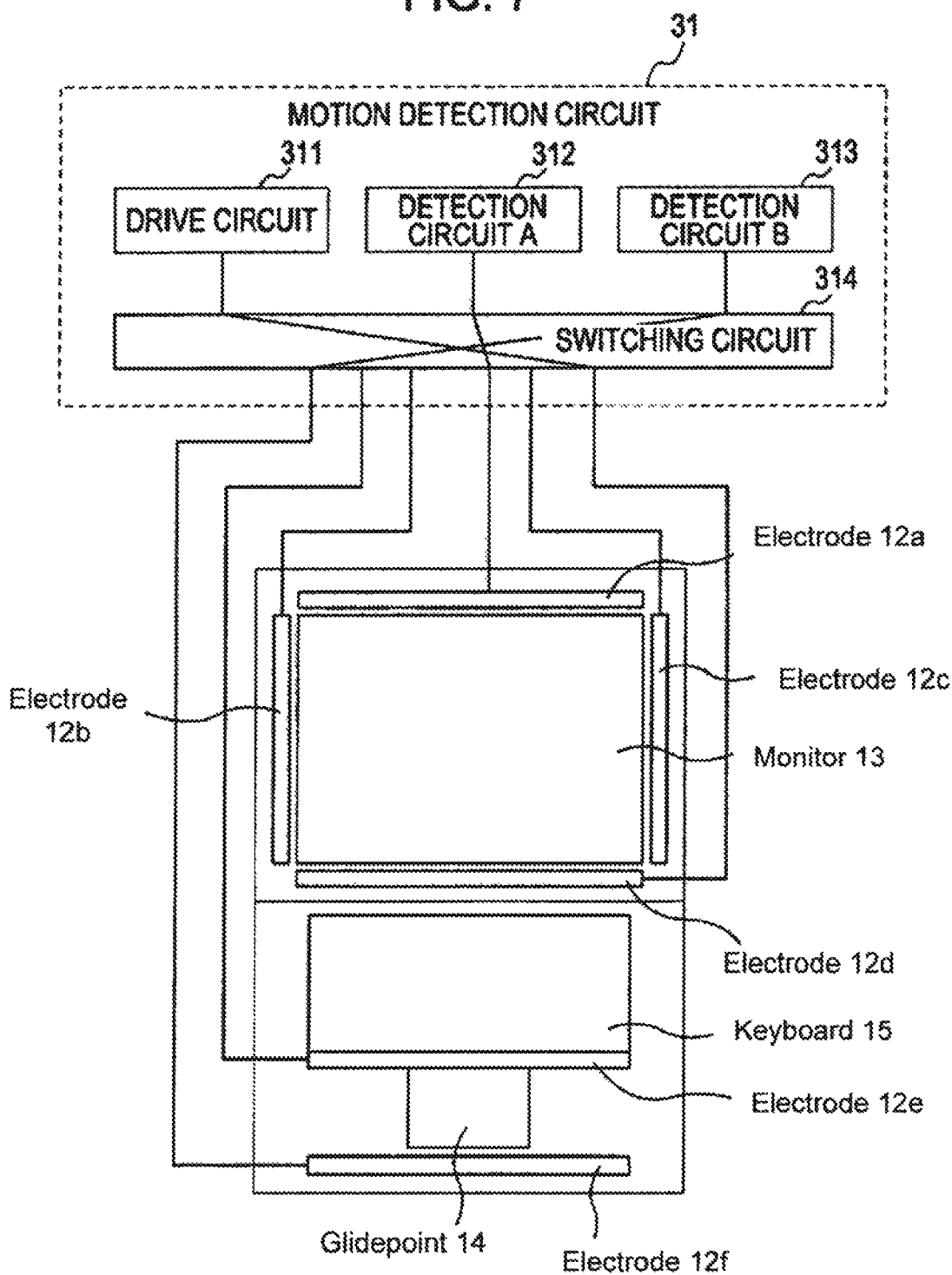
FIG. 7 shows a configuration of electrode connections in the capacitive motion detection according to the embodiment of the present invention.

When motions in the Z-axis direction are detected, the electrode 12d is set as a drive electrode, and the electrodes 12a and 12f are set as detection electrodes, as shown in FIG. 7. Thus, the switching circuit 314 performs switching so as to electrically connect the drive circuit 311 to the electrode 12d, electrically connect the detection circuit (A) 312 to the electrode 12a, and electrically connect the detection circuit (B) 313 to the electrode 12f. In the motion detection circuit 31, in which connections are established in this manner, motions can be detected using the arrangement shown in FIG. 2A. The drive circuit 311 drives the drive electrode 12d, and then the position of an object to be detected in the Z-axis direction is obtained from the difference between capacitances detected by the detection circuits (A and B) 312 and 313 at this time.

In this case, when the device main body 11 includes an angular sensor that measures the angle between the monitor 13 and the keyboard 15, in a case where motions in the Z-axis direction are detected, the result of detecting motions can be corrected using an angle measured by the angular sensor. In this arrangement, for example, the influence of the degree of opening or closing of the notebook PC 1 on the result of detecting motions can be reduced, and thus motions in the Z-axis direction can be detected more accurately.

In the notebook PC 1 including a capacitive motion detection device according to the present invention, it is expected that, when the keyboard 15 is being operated, the hand 2 will be close to the capacitive motion detection device, and thus an input operation on the keyboard 15 may be detected as a motion. Thus, in the present invention, assuming that a keyboard input operation and a motion input operation are seldom performed at the same time, an arrangement that switches between a mode in which a user (an operator) intentionally performs a motion input operation and a mode (a normal mode) in which the user performs an input operation (in this case, a keyboard input operation) other than a motion input operation is adopted. That is, the capacitive motion detection device may include a switching unit that switches the mode to the motion detection mode. For example, a capacitive sensor may be provided so as to switch the mode to the motion detection mode when a capacitance detected by the capacitive sensor is less than a predetermined threshold value.

When the normal mode is detected, the electrode 12f is set as a drive electrode, and the electrode 12e is set as a detection electrode, as shown in FIG. 8. Thus, the switching circuit 314 performs switching so as to electrically connect the drive circuit 311 to the electrode 12f and electrically connect the detection circuit (A) 312 to the electrode 12e. In this arrangement, when the hand 2 is distant from the capacitive sensor, it is determined that a motion input operation is being performed. When the hand 2 is close to the capacitive sensor, it is determined that no motion input operation is being performed (a keyboard input operation is being performed), and thus the motion detection (motion input operation) mode is changed. In this case, when a capacitance between the capacitive sensor and the hand 2 is less than a threshold value, it is determined that the hand 2 is distant from the capacitive sensor, and thus the mode is switched to the motion detection mode. When the capacitance between the capacitive sensor and the hand 2 is equal to or more than the threshold value, it is determined that the hand 2 is close to the capacitive sensor, and thus the mode is switched to the normal mode. In this case, position detection is not performed. Thus, the electrode 12e may be set as a detection electrode, and the electrode 12f may be set as a drive electrode. Moreover, other electrodes may be set as a drive electrode and a detection electrode as long as the normal mode can be detected.

A case has been described where directions along a surface of a rectangular monitor area are set as an area to be operated for an object to be detected, detection electrode/drive electrode pairs constituted by electrodes provided on two opposing sides of the monitor area are set as detection electrode/drive electrode pairs that detect motions in the X-axis and Y-axis directions, and detection electrode/drive electrode pairs constituted by electrodes provided on two opposing sides of the monitor area and an electrode provided in a keyboard area are set as detection electrode/drive electrode pairs that detect motions in the Z-axis direction. Alternatively, in the present invention, an area above the rectangular keyboard area may be set as an area to be operated for an object to be detected, detection electrode/drive electrode pairs constituted by electrodes provided on two opposing sides of the keyboard area may be set as detection electrode/drive electrode pairs that detect motions in the X-axis and Y-axis directions, and detection electrode/drive electrode pairs constituted by electrodes provided on two opposing sides of the keyboard area and an electrode provided in the monitor area may be set as detection electrode/drive electrode pairs that detect motions in the Z-axis direction.

Figure 9A:
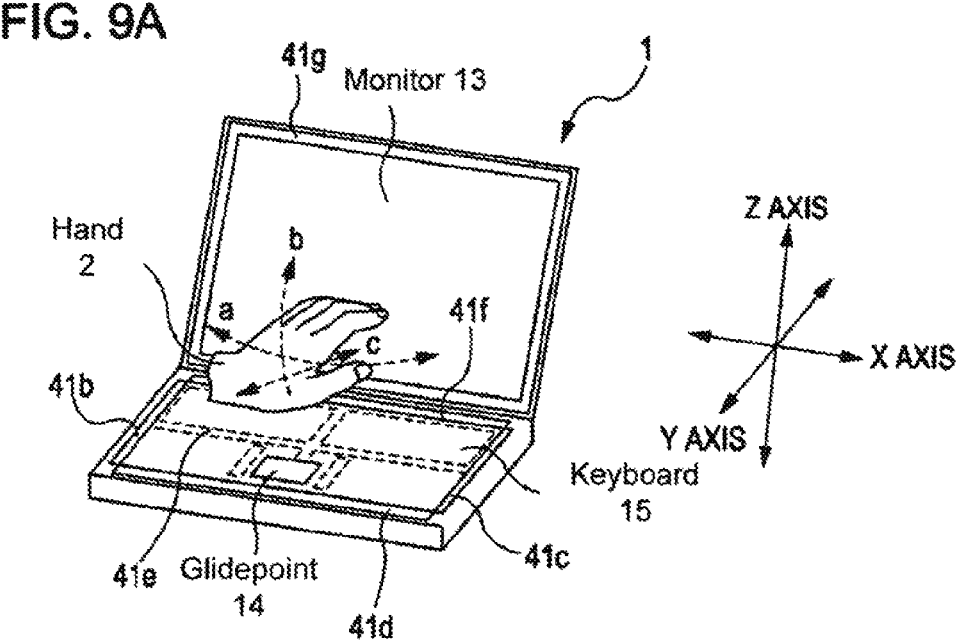
FIGS. 9A and 9B show other exemplary input devices using the capacitive motion detection device according to the embodiment of the present invention.
Figure 9B:
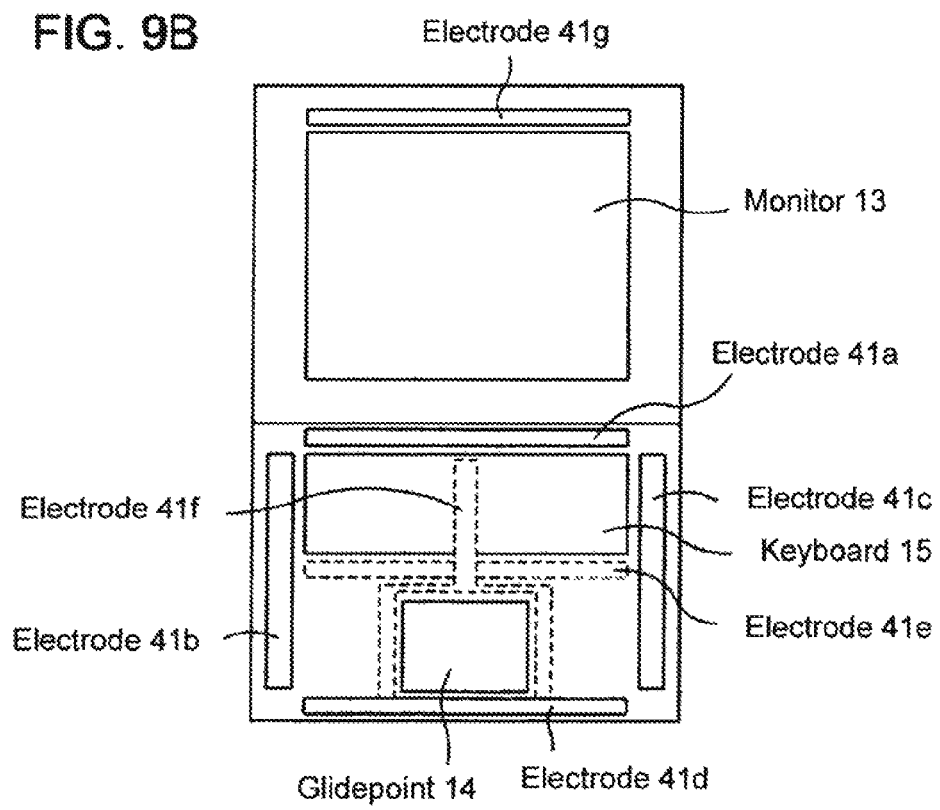

For example, an area above the keyboard 15 is set as an area to be operated serving as the detection reference for the hand 2, which is an object to be detected, the horizontal direction (a dashed arrow line a) of the keyboard area is set as the X-axis, the depth direction (a dashed arrow line c) of the keyboard area is set as the Y-axis, and the vertical direction (a dashed arrow line b) of the keyboard area is set as the Z-axis, as shown in FIG. 9A. That is, the notebook PC 1 includes electrodes 41a, 41b, 41c, and 41d formed around the keyboard 15, an electrode 41g formed opposite the electrode 41a with the monitor 13 between the electrode 41g and the electrode 41a, and electrodes 41e and 41f formed in the keyboard area so that the electrodes 41e and 41f are substantially perpendicular to each other, as shown in FIGS. 9A and 9B. These electrodes are provided at individual detection positions for an area to be operated and constitute two or more detection electrode/drive electrode pairs in each of which a capacitance is formed between a detection electrode and a drive electrode.

In such an arrangement, when motions in the X-axis direction are detected, the electrode 41f is set as a drive electrode, and the electrodes 41b and 41c are set as detection electrodes. In the motion detection circuit, in which connections are established in this manner, motions can be detected using the arrangement shown in FIG. 2A. The drive circuit drives the drive electrode 41f, and then the position of an object to be detected in the X-axis direction is obtained from the difference between capacitances detected by the detection circuits at this time.

When motions in the Y-axis direction are detected, the electrode 41e is set as a drive electrode, and the electrodes 41a and 41d are set as detection electrodes. In the motion detection circuit, in which connections are established in this manner, motions can be detected using the arrangement shown in FIG. 2A. The drive circuit drives the drive electrode 41e, and then the position of an object to be detected in the Y-axis direction is obtained from the difference between capacitances detected by the detection circuits at this time.

When motions in the Z-axis direction are detected, the electrode 41a is set as a drive electrode, and the electrodes 41g and 41d are set as detection electrodes. In the motion detection circuit, in which connections are established in this manner, motions can be detected using the arrangement shown in FIG. 2A. The drive circuit drives the drive electrode 41a, and then the position of an object to be detected in the Z-axis direction is obtained from the difference between capacitances detected by the detection circuits at this time.

When the normal mode is detected, the electrode 41d is set as a drive electrode, and the electrode 41e is set as a detection electrode. In this case, position detection is not performed. Thus, the electrode 41d may be set as a detection electrode, and the electrode 41e may be set as a drive electrode. Moreover, other electrodes may be set as a drive electrode and a detection electrode as long as the normal mode can be detected.

As described above, according to the embodiment, since the motions of an object to be detected in an area to be operated are detected on the basis of a variation in a capacitance obtained in each of the two or more detection electrode/drive electrode pairs, a capacitive motion detection device that has a simple configuration, has few limitations regarding the operating environment, is not likely to affect a device due to vibrations, and need not include a specific input device can be implemented. In an input device that includes such a capacitive motion detection device, various types of operations, for example, changing the hierarchical level of a page of an application, turning pages, scrolling a screen, and operating a specific part, can be performed by capacitive motion detection.

The present invention is not limited to the aforementioned embodiment and may be changed in various forms. For example, right or left, upper or lower, front or back, the number, positions, sizes, and shapes of electrodes, the configuration of connections in a case where motions in the X-axis, Y-axis, and Z-axis directions are detected, and the sequence of control in the aforementioned embodiment may be fitly changed. Moreover, since the device main body includes a capacitive sensor, the function may be used as a function of detecting the approach of a person. For example, an arrangement may be adopted in which it is determined whether a person is approaching a device that includes the capacitive motion detection device, and when a person is moving away from the device, the mode is automatically changed to a power saving mode; when a person is approaching the device, the power saving mode is automatically cancelled. Moreover, changes may be fitly made in the present invention without departing from the scope of the present invention.

What is claimed is:
1. A capacitive motion detection device comprising:
a device main body;
two or more detection electrode/drive electrode pairs in each of which a capacitance is formed between a detection electrode and a drive electrode, the detection electrode/drive electrode pairs being provided at detection positions of the device main body;
a motion detection circuit configured to detect motions of an object to be detected in two or more axis directions from a variation in a capacitance obtained in each of the detection electrode/drive electrode pairs, the motion detection circuit including a drive circuit and a detection circuit; and
a switching circuit configured to selectively coupling the drive circuit and the detection circuit to the detection electrode/drive electrode pairs,
wherein the device main body includes a substantially rectangular first area having four sides, the detection electrode/drive electrode pairs including:
first and second electrodes disposed on first two opposing sides of the first area;
third and fourth electrodes disposed on second two opposing sides of the first area; and
a fifth electrode disposed outside the first area,
and wherein the switching circuit is configured to:
connect the third and fourth electrodes to the drive circuit and the first and second electrodes to the detection circuit such that the motion detection circuit detects a motion of the object in a first axis direction;
connect the first and second electrodes to the drive circuit and the third and fourth electrodes to the detection circuit such that the motion detection circuit detects a motion of the object in a second axis direction crossing the first axis direction; and
connect the first, second, and fifth electrodes, or the third, forth, and fifth electrodes, to the motion detection circuit such that the motion detection circuit detects a motion of the object in a third axis direction crossing the first axis direction and the second axis direction.

2. The capacitive motion detection device according to claim 1, wherein at least one electrode of the detection electrode/drive electrode pairs is connected to the drive circuit when a motion in one axis direction is detected and is connected to the detection circuit when a motion in another axis direction is detected, in an alternate manner in a time sharing mode, using the switching means.

3. The capacitive motion detection device according to claim 1, wherein the detecting means detects a motion of the object to be detected from a difference value between capacitances detected by a plurality of electrodes connected to the detection circuit.

4. The capacitive motion detection device according to claim 1, wherein a display unit is provided in the first area.

5. The capacitive motion detection device according to claim 1, wherein the device main body further includes a second area different from the first area.

6. The capacitive motion detection device according to claim 5, wherein a display unit is provided in one of the first area and the second area.

7. The capacitive motion detection device according to claim 6, wherein an input unit is provided in the other of the first area and the second area, in which the display unit is not provided.

8. The capacitive motion detection device according to claim 7, wherein a capacitive sensor that detects approach of an object to be detected is provided near the input unit, and when a capacitance detected by the capacitive sensor is equal to or more than a threshold value, no motion is detected.

9. The capacitive motion detection device according to claim 5, wherein the device main body includes:
an angle measuring unit configured to measure an angle between the first area and the second area, and when a motion in the third axis direction is detected, correction is made using the angle measured by the angle measuring unit.

10. The capacitive motion detection device according to claim 1, wherein the device main body further includes a second area that is different from the first area, the fifth electrode being provided in the second area.

11. The capacitive motion detection device according to claim 10, wherein a display unit is provided in the first area or the second area.

12. The capacitive motion detection device according to claim 11, wherein an input unit is provided in the other of the first area and the second area, in which the display unit is not provided.

13. The capacitive motion detection device according to claim 10, wherein the device main body includes:
an angle measuring unit configured to measure an angle between the first area and the second area, and when a motion in the third axis direction is detected, correction is made using the angle measured by the angle measuring unit.

14. The capacitive motion detection device according to claim 1, wherein a capacitive sensor that detects approach of an object to be detected is provided, and when a capacitance detected by the capacitive sensor is equal to or more than a threshold value, no motion is detected.

15. An input device comprising:
the capacitive motion detection device according to claim 1; and
control means for operating the device main body on the basis of detection of a motion of the object to be detected, the detection being performed by the capacitive motion detection device, the control means being included in the device main body.

16. A capacitive motion detection device comprising:
a device main body including a first area and a second area different from the first area;
two or more detection electrode/drive electrode pairs in each of which a capacitance is formed between a detection electrode and a drive electrode, the detection electrode/drive electrode pairs being provided at detection positions of the device main body;
a motion detection circuit configured to detect motions of an object to be detected in two or more axis directions from a variation in a capacitance obtained in each of the detection electrode/drive electrode pairs, the motion detection circuit including a drive circuit and a detection circuit; and
a switching circuit configured to selectively coupling the drive circuit and the detection circuit to the detection electrode/drive electrode pairs,
wherein at least one electrode of the detection electrode/drive electrode pairs is provided in the first area, at least one electrode of the detection electrode/drive electrode pairs is provided in the second area, the motion detection circuit detecting motions in three axis directions,
and wherein the first area is substantially rectangular, a direction of a surface of the first area is an area to be operated for the object to be detected, detection electrode/drive electrode pairs formed by electrodes provided on two opposing sides of the first area are detection electrode/drive electrode pairs that detect motions in a first axis direction and a second axis direction, and detection electrode/drive electrode pairs formed by electrodes provided on two opposing sides of the first area and an electrode provided in the second area are detection electrode/drive electrode pairs that detect a motion in a third axis direction.

17. A capacitive motion detection method for detecting motions of an object to be detected in two or more axis directions from a variation in a capacitance obtained in each of two or more detection electrode/drive electrode pairs in each of which a capacitance is formed between a detection electrode and a drive electrode, using a motion detection circuit including a drive circuit and a detection circuit, the detection electrode/drive electrode pairs including: first and second electrodes disposed on first two opposing sides of a substantially rectangular first area third and fourth electrodes disposed on second two opposing sides of the first area; and a fifth electrode disposed outside the first area, the method comprising:
detecting a motion of the object in a first axis direction by connecting the third and fourth electrodes to a drive circuit and connecting the first and second electrodes to a detection circuit;
detecting a motion of the object in a second axis direction crossing the first axis direction by connecting the first and second electrodes to the drive circuit and connecting the third and fourth electrodes to the detection circuit; and
detecting a motion of the object in a third axis direction crossing the first axis direction and the second axis direction, by connecting the first, second, and fifth electrodes to the motion detection circuit, or connecting the third, forth, and fifth electrodes to the motion detection circuit.

18. The capacitive motion detection method according to claim 17, wherein a motion of the object to be detected is detected from a difference value between capacitances detected by a plurality of electrodes connected to the detection circuit.

19. The capacitive motion detection method according to claim 17, further comprising, when detecting the motion of the object in the third axis direction:
measuring an angle between the first area and the second area, and making a correction to the detected motion using the angle measured by the angle measuring unit.

20. The capacitive motion detection method according to claim 17, further comprising:
switching the connection of the electrodes of the detection electrode/drive electrode pairs to the drive circuit and the detection circuit in an alternate manner in a time sharing mode so as to detect the motion of the object in different axis directions.

21. The capacitive motion detection method according to claim 17, wherein at least one detection electrode/drive electrode pair is provided in a second area different from the first area, the method further comprising:
determining if an object is on or in a vicinity of the second area by detecting a motion of the object by connecting one electrode of the at least one detection electrode/drive electrode pair to the detection circuit and connecting another electrode of the at least one detection electrode/drive electrode pair to the drive circuit.

* * * * *